(12) United States Patent
Vágány et al.

(10) Patent No.: US 10,768,192 B2
(45) Date of Patent: Sep. 8, 2020

(54) DEVICE AND METHOD TO SAMPLE LIQUIDS WITH HIGH-PRECISION IN AN AUTOMATED SAMPLE ANALYZER

(71) Applicant: Diatron MI Zrt., Budapest (HU)

(72) Inventors: Balázs Vágány, Budapest (HU); Dániel Gergely Isztli, Budapest (HU); Barna Reskó, Budapest (HU); Katalin Kizman, Debrecen (HU)

(73) Assignee: DIATRON MI ZRT., Budapest (HU)

( * ) Notice: Subject to any disclaimer, the term of this patent is extended or adjusted under 35 U.S.C. 154(b) by 0 days.

(21) Appl. No.: 16/300,461

(22) PCT Filed: May 11, 2017

(86) PCT No.: PCT/HU2017/050016
§ 371 (c)(1),
(2) Date: Nov. 9, 2018

(87) PCT Pub. No.: WO2017/194983
PCT Pub. Date: Nov. 16, 2017

(65) Prior Publication Data
US 2019/0145998 A1       May 16, 2019

Related U.S. Application Data

(60) Provisional application No. 62/334,539, filed on May 11, 2016.

(30) Foreign Application Priority Data

May 11, 2016 (EP) .................................. 16169243

(51) Int. Cl.
*G01N 35/10* (2006.01)
*G01N 1/14* (2006.01)
(Continued)

(52) U.S. Cl.
CPC ...... *G01N 35/1016* (2013.01); *F16K 11/0743* (2013.01); *G01F 11/16* (2013.01);
(Continued)

(58) Field of Classification Search
CPC .. F16K 11/0743; G01N 35/1016; G01N 1/14; G01N 35/1097; G01N 35/1004;
(Continued)

(56) References Cited

U.S. PATENT DOCUMENTS 4,152,391 A * 5/1979 Cabrera ............. G01N 35/1097
422/501
4,463,615 A    8/1984 Buzza
(Continued)

FOREIGN PATENT DOCUMENTS

EP          3244214      11/2017
JP          56057986      5/1981
(Continued)

OTHER PUBLICATIONS

Search Report and Written Opinion of the International Searching Authority dated Sep. 26, 2017, for rresponding International Application No. PCT/HU2017/050016 (11 pgs.).
(Continued)

*Primary Examiner* — Brian R Gordon
(74) *Attorney, Agent, or Firm* — Fitch, Even, Tabin & Flannery LLP (57) ABSTRACT

The invention is directed to an instrument and method of use in which a sample is taken from a sample container with a sampling member (10) and is directly transferred to an inlet of a flow structure that includes a aliquoting chamber for segmenting an aliquot of the sample with high-precision. That is, there is no need to direct the sample over a long passageway in the sampling member (10) before a sample portion could be dispensed by a sampling unit.

6 Claims, 8 Drawing Sheets

(51) Int. Cl.
  *G01F 11/16* (2006.01)
  *F16K 11/074* (2006.01)
  *G01N 1/38* (2006.01)

(52) U.S. Cl.
  CPC .............. *G01N 1/14* (2013.01); *G01N 1/38* (2013.01); *G01N 35/1004* (2013.01); *G01N 35/1097* (2013.01)

(58) Field of Classification Search
  CPC ............. G01N 1/38; B01L 2400/0622; B01L 2400/0633; B01L 2400/0644; B01L 2400/065; B01L 3/567
  USPC .................................................. 422/537–540
  See application file for complete search history.

(56) References Cited

U.S. PATENT DOCUMENTS

| | | | |
|---|---|---|---|
| 4,507,977 A | | 4/1985 | Cabrera |
| 4,726,932 A | * | 2/1988 | Feier ................ G01F 11/14 422/501 |
| 4,896,546 A | * | 1/1990 | Cabrera ............ G01N 1/38 73/863.73 |
| 4,948,565 A | * | 8/1990 | Bemis .............. G01N 35/1097 251/355 |
| 5,158,751 A | * | 10/1992 | del Valle .......... G01N 35/1097 251/355 |
| 5,616,300 A | * | 4/1997 | Ford ................ G01N 30/32 251/304 |
| 6,322,752 B1 | * | 11/2001 | Siddiqui .......... G01N 35/10 422/105 |
| 6,662,826 B1 | | 12/2003 | Kokawa |
| 6,852,291 B1 | * | 2/2005 | Johnson ............ B01J 19/0046 137/597 |
| 6,890,489 B2 | * | 5/2005 | Nichols ............ H01J 49/04 422/540 |
| 7,661,326 B2 | | 2/2010 | Li |
| 2005/0214172 A1 | * | 9/2005 | Burgisser ........... B01L 3/022 422/400 |
| 2008/0098828 A1 | | 5/2008 | Li |
| 2016/0361718 A1 | * | 12/2016 | Henon .............. B01L 3/567 |

FOREIGN PATENT DOCUMENTS

| | | |
|---|---|---|
| JP | 589072 | 1/1983 |
| JP | 5892822 | 6/1983 |
| JP | 59122955 | 7/1984 |
| JP | 6197570 | 5/1986 |
| JP | 0335160 | 2/1991 |
| JP | 11183472 | 7/1999 |
| JP | 2007127535 | 5/2007 |
| JP | 5131669 | 10/2013 |
| JP | 2019515309 | 6/2019 |

OTHER PUBLICATIONS

JP Notice of Reasons for Refusal; dated Apr. 22, 2019; 6 pages.

* cited by examiner

DEVICE AND METHOD TO SAMPLE LIQUIDS WITH HIGH-PRECISION IN AN AUTOMATED SAMPLE ANALYZER

CROSS REFERENCE TO RELATED APPLICATIONS

This patent application is the national phase of PCT/HU2017/050016, filed May 11, 2017, which claims the benefit of U.S. Provisional Application No. 62/334,539, filed May 11, 2016.

TECHNICAL FIELD

The present invention relates to improvements in devices for sampling liquids, e.g. various biological liquids, in particular, whole blood, urine, etc. arranged in sample containers. In particular, the invention relates to a high-precision sampling unit and method for sampling body fluids in automated sample analyzer instruments. Here, and from now on, the term 'sampling' or 'to sample' refers to the technical process of taking an amount of liquid sample from a sample container by means of a sampling member and then dispensing at least one precise volume of the liquid sample taken for the purpose of testing and/or analyzing and/or further processing.

BACKGROUND

The present invention is particularly useful in the fields of hematology, flow cytometry and blood chemistry in which it is often necessary to dispense relatively small volumes (e.g. 1-30 microliters) of whole blood and/or a prepared blood sample with high precision and in an automated way. The invention, however, can also be used when assaying other body fluids, as well as in the field of analytical chemistry in which similar requisites might be fulfilled.

In conducting tests on samples of biological liquids, it is common to provide the sample to an automated analyzer in test tubes or vials that are either open or sealed, typically by a rubber stopper, and arranged on a sampling tray close to each other. Upon receiving the sampling tray with a multiplicity of vials containing samples, the vials are transported, one after the other, to a sampling station formed preferably in the analyzer itself where the tip of the sampling member enters the sample volume. Depending on the situation whether the vial is open or sealed, i.e. closed, said tip can be a sharpened portion of the sampling member or it is provided simply by just a butt end thereof. To help with collecting biological liquids of interest, particularly whole blood, from humans or animals, closed vials are manufactured with a certain amount of vacuum inside that may partially remain within the vial after completion of collection. This implies that the value of pressure in the vial is unknown at the time of collecting the sample.

To perform a measurement on the vial, at first a portion of the sample in said vial is taken out, i.e. aspirated from the vial into the tip of the sampling member. Then at least a tiny aliquot of the aspirated sample is dispensed into a mix chamber where in most cases it gets prepared for the analysis, i.e. appropriately diluted before being analyzed. Special care should be devoted to the sampling of open vials, as these should be kept in a vertical position over the whole sampling procedure in order to avoid spilling of the sample contained in the vial.

Hematology analyzers, in general, are intended for performing a complete blood count and hemoglobin measurement in human or animal whole blood. To actually perform the measurement, a hematology analyzer prepares a mix solution, with high precision, from the aliquot amount of blood sample aspirated from the vial by diluting it to about 250 times in the mix chamber using an isotonic diluent. To achieve high precision, the amount of blood used in the dilution should be very accurate as well.

In general, the liquid aspirating and dispensing means of automated hematology analyzers is one of two types: (i) those that basically use a precision syringe pump connected to the sampling member for both sucking a portion of the blood sample from its vial and then dispensing a metered aliquot amount thereof through the same sampling member into the mix chamber (this is often referred to as the "suck-and-spit" technique), and (ii) those that aspirate said blood sample into a blood sampling valve ("BSV"), or shear valve assembly, that segments the aspirated sample into one or more precise aliquots for subsequent dispensing by means of exploiting a so-called aliquoting chamber formed as integral part of the blood sampling valve. Both sampling techniques have some advantages and disadvantages, just to mention in case (i) the problem of accuracy regarding the aspiration and/or dispensing that depends, actually, on the accuracy of moving the plunger of the syringe pump in opposite directions, and in case (ii) the problems of considerable manufacturing costs and relatively large volumes of spoiled sample, as discussed in U.S. Pat. No. 7,661,326 B2 (Li et al.) in detail. To eliminate or at least alleviate disadvantages of the above-discussed techniques, U.S. Pat. No. 7,661,326 B2 discloses a kind of 'hybrid' technique, according to which the high accuracy in aliquoting provided by the BSV technique is combined with the lower volume sample consumption of the suck-and-spit technique.

In particular, U.S. Pat. No. 7,661,326 B2 teaches a hybrid sampling apparatus to be used in an automated analytical instrument, comprising a sampling member to effect sampling, a transport system for selectively advancing said sampling member to take (or dispense) liquid sample from (or to) different containers spaced apart, a sampling valve assembly operatively connected to the sampling member to perform aliquoting and dispensing, and a pump operatively connected to the sampling valve assembly and selectably operable to either (i) draw a liquid sample through the sampling member and through the valve assembly to fill at least one aliquoting chamber thereof, or (ii) to dispense the aspirated liquid sample through the sampling member into one or more mix chambers. After being taken out, the sample is moved by the pump along a sample flow path that includes the passageway of the sampling member in its full length, as well as a complicated arrangement of interconnected bore holes and surface grooves formed in or on the surfaces of valve pads constituting the shear valve assembly. Due to the construction, the sample travels a relatively long way within the hybrid sampling apparatus from the sample container(s) to the mix chamber(s). Or putting this another way, the hybrid sampling apparatus suffers from the disadvantage of long sample flow path.

Due to physical/chemical properties and composition of body fluids as the sample, in particular whole blood, a portion of the sample transferred from a sample container to a mix chamber tends to adhere on the internal wall of the flow path, i.e. the tubing used for the transfer. This increases sample demand when sample is taken out. Moreover, as is found experimentally, various components of body fluids have different tendencies for adhering on the tubing wall. Adhering might cause, in turn, a qualitative distortion in the composition of the sample to be studied and thus the final measuring data. The longer, hence, the flow path said sample has to run within the sampling device, the higher is the probability of said qualitative distortion. In light of this, it would be advantageous to decrease, in particular, minimize the length of the flow path to be travelled along by the sample within a sampling apparatus.

A possible way to decrease the sample flow path is to integrate the sampling member directly into the sampling valve; such a solution is known in the prior art in the form of a BSV with a sampling member fixed into it in the upward pointing position. Hence, to perform sampling with the device, the sample tube has to be turned upside-down. As is clear, this kind of a sampling device is not applicable with open sample tubes. A yet further disadvantage of the device arises when its application in automated analyzers comes about: in such cases, the analyzer should be equipped with a suitable turning mechanism to turn the individual sample tubes into the upside-down position for sampling and then back for storage which would clearly retard the sampling procedure and increase the costs of both sampling and manufacturing.

U.S. Pat. Nos. 4,463,615 and 4,507,977 equally teach liquid metering and transfer valves wherein a sampling member is integrated into the metering valves.

U.S. Pat. No. 6,662,826 B1, regarded as the closest prior art, discloses a multi-disc liquid metering and transfer valve with a port switch valve disc having at least two inlet connections, i.e. a sampling unit to dispense a given volume of liquid sample in accordance with the preamble of claim 1. Said metering and transfer valve is provided with a relatively long sampling path. Thus, in operation, the adherence of sample on the walls of the sampling path is increased that greatly influence the quality of the sample dispensed. Furthermore, to dispense the given volume of liquid sample, said metering and transfer valve performs lateral movements which require additional space during operation.

Precision of sampling is of high interest in the case of analytical instruments, such as e.g. a HPLC equipment or various body fluid analyzers, like the automated hematology analyzers. In certain cases, only tiny amounts of sample are available. The smaller the sample volume to be worked with is, the more difficult it is to achieve the high precision when dispensing is performed. If the dispensed sample should be diluted before its further processing, the amount of diluent also matters; to achieve a certain preset concentration required by a measurement or testing, it is obvious that smaller sample volumes require less diluent.

Hence, to save costs, it is a continuous task in analytics to decrease the volume of the sample to be assayed and also to use it up efficiently (i.e. essentially completely, possibly without flushing a portion thereof to waste), along with—if possible—increasing, but at least maintaining the level of precision when said volume is dispensed.

SUMMARY

In view of the foregoing discussion, an object of the invention is to provide an improved sampling unit with high precision in dispensing of small sample amounts, wherein the sample flow path is significantly reduced, in particular, is minimal.

Another object of the invention is to provide a sampling unit efficient in utilizing the amount of the sample taken from a sample container.

A further object of the invention is to provide a sampling unit that can equally be used with open and closed sample containers.

A yet further object of the invention is to simplify sampling unit construction and thus decrease manufacturing costs, as well as complexity.

The above objects are achieved by means of a novel construction of the sampling unit, wherein the sample taken from a sample container with a sampling member is directly transferred to the inlet of a flow structure comprising the aliquoting chamber for segmenting an aliquot of sample with high-precision, that is, there is no need to direct the sample over a long passageway in the sampling member before a sample portion could be dispensed by the sampling unit. Thus, harmful influences of the long passageway over which the sample has to travel when sampled are significantly decreased. This results in an increasing sample quality. Moreover, due to the novel construction of the sampling unit, sampling and dispensing can be performed, by e.g. an analytical instrument by means of moving said sampling member only in one dimension, i.e. its longitudinal axis. That is, no movements laterally to said longitudinal axis are required for the dispensing. By the novel construction of the sampling unit, aspiration of the sample into the liquid-sampling valve through the sampling member can also be avoided.

In particular, the present invention relates to a sampling unit for dispensing a precise volume of liquid sample from a sample container in an automated analytical instrument, as well as to an automated analytical instrument for performing the sampling. The present invention also relates to a method to dispense a precise volume of liquid sample from a sample container, as well as to a method to sample body fluid arranged in a sample container.

BRIEF DESCRIPTION OF THE DRAWINGS

The invention and its further advantages will be apparent and can be better understood at once from the detailed description of a preferred embodiment to be used in automated hematology analyzers with reference to the attached drawings, wherein.

DETAILED DESCRIPTION

Figure 1A:
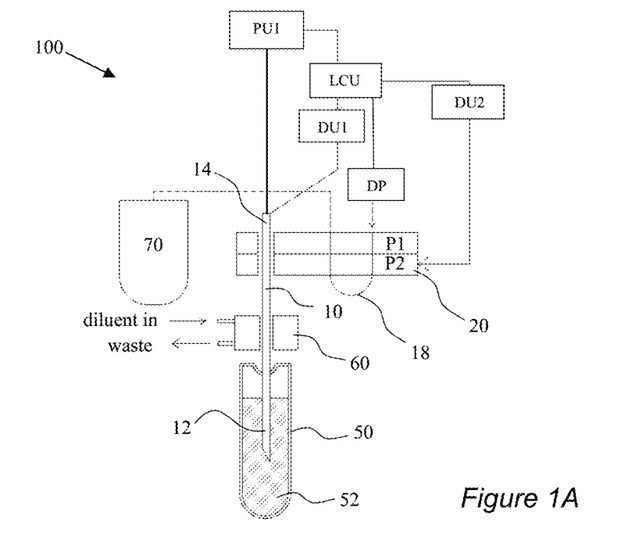
FIGS. 1A and 1B are schematic illustrations of a portion of an analytical instrument, in particular a hematology analyzer, comprising the improved sampling unit according to the invention in its different configurations, namely the sample taking/dispensing/discharging configuration (FIG. 1A) and the sample loading configuration (FIG. 1B)
Figure 1B:
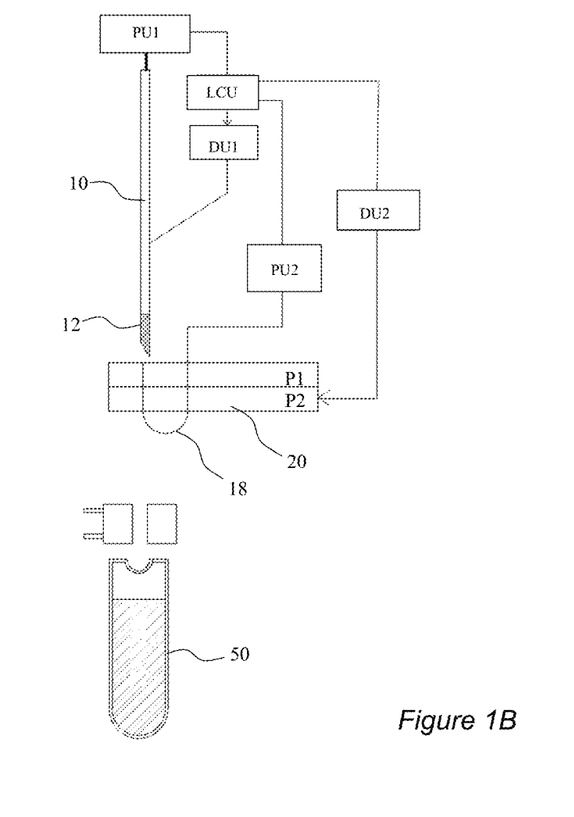

Referring to FIGS. 1A and 1B, the sampling unit 100 of the invention is depicted as being embodied as part of a conventional automated instrument, a hematology analyzer for assaying whole blood samples, one at a time. To this end, the analyzer includes a sampling member 10 and a liquid-sampling valve 20 as parts of the sampling unit 100, as well as additional further units and/or elements (e.g. various tubings, connectors, valves, etc.) that are also needed for the normal operation of the analyzer. The sampling member 10 is formed as a hollow tubular, straight element having a longitudinal axis and terminating at one ends thereof in a sampling tip 12. Said tip 12 is either sharpened or butt and serves to access a liquid sample 52, here whole blood, arranged in either a closed or an open sample container 50, respectively, to aspirate and hold a certain small amount thereof. The other end 14 of the sampling member 10 is configured to be fluidly connected via an appropriate tubing to a first pump unit PU1 of the analyzer. To access the sample 52, the sampling member 10 is mounted in the analyzer for vertical movement along its longitudinal axis and through valve body of said sampling valve 20 that is adapted to allow this movement, as will be discussed later. As is, however, obvious to a person skilled in the art, the sampling member 10 can be mounted to perform also lateral movement before its tip 12 actually accesses the sample 52, i.e. movement perpendicular to the vertical direction in which the tip 12 moves to access the sample 52. As illustrated, the sampling valve 20 is essentially a shear valve assembly with a valve body comprising confronting and contiguous upper shear valve pad P1 and lower shear valve pad P2, both having a plurality of through bore holes, strategically located therein. The shear valve pads P1 and P2 are movable with respect to each other to selectively cause the respective bore holes to become either aligned, whereby liquid can flow between said valve pads P1 and P2, or misaligned whereby such flow of liquid is totally prevented. In FIG. 1A the sampling valve 20 is shown in the sample taking configuration in which the first pump unit PU1 draws or aspirates a tiny amount of blood sample into the sampling tip 12 in a completely advanced position (second position) of the sampling tip 12, i.e. when said tip 12 has passed through the valve body of the sampling valve 20 to access the sample 52 and locates between the sampling container 50 and the lower valve pad P2, i.e. practically below the lower valve pad P2. When the aspirated blood in the sampling tip 12 reaches the predefined tiny amount/volume, which is optionally controlled by measuring and comparing the aspiration period for which the first pump unit PU1 is actually operated with a predetermined value, a signal is transmitted to a programmable logic and control unit LCU, arranged in and being part of the analyzer; as a result the sample taken from the sample container 50 will occupy a certain volume of the sampling tip 12, but it never exceeds the other end 14. Now, the programmable logic and control unit LCU operates to deactivate the first pump unit PU1, and then to activate a first drive unit DU1 to retract the sample tip 12 with sample into its starting position (first position) in which it locates practically above the upper valve pad P1 and then to adjust the relative position of the valve pads P1 and P2 to a position shown in FIG. 1B that corresponds to the sample loading configuration of the sampling unit 100. In the sample loading configuration the programmable logic and control unit LCU then operates to activate the first pump unit PU1 to expel or feed the blood sample aspirated previously into the tip 12 into the vicinity of the inlet of a continuous flow structure in the sampling valve 20 formed by aligned respective through bores thereof. Upon feeding the sample over the inlet of the flow structure, the programmable logic and control unit LCU operates to activate a second pump unit PU2 in fluid communication with a discharge outlet of said flow structure in the sampling valve 20 to draw the blood sample from said inlet through the flow structure to its outlet, and also through an aliquoting chamber 18 constructed within the sampling valve 20 as part of the flow structure. When the drawn blood sample reaches the upper valve pad P1, which is detected e.g. by a built-in blood detector (not illustrated) or again on time basis, a signal is transmitted to the programmable logic and control unit LCU which then operates to deactivate the second pump unit PU2 and then to adjust the relative position of the valve pads P1 and P2 to the discharging configuration of the sampling unit 100 also illustrated in FIG. 1A (represented by dashed lines). As a result of this last operation, a precise aliquot of the blood sample gets segmented or isolated from the drawn blood sample and is ready to be dispensed and then discharged from the sampling valve 20 for further processing and/or analysis, in particular, to be diluted by a liquid diluent to perform e.g. a red blood cell count measurement. Discharge of the precise aliquot of blood takes place into a mix chamber 70 by a diluent pump DP in fluid communication with the sampling valve 20 in the actual configuration of the sampling unit 100; said diluent pump DP, upon activated by the programmable logic and control unit LCU, chases the precise aliquot of blood into said mix chamber 70 by pumping liquid diluent through the sampling valve 20.

As will be appreciated, the precise aliquot amount of blood is defined, in general, by the volume of the flow structure formed within the lower valve pad P2. Typically, this volume is selected to be between 1 and 10 microliters. In a possible embodiment of the liquid-sampling valve used in the invention, the aliquoting chamber 18 is constructed in the form of a U-shaped hollow tubular element connecting two through bore holes in the lower valve pad P2, wherein said tubular connecting element projects out from said lower valve pad P2. As is obvious to a person skilled in the art, in such an embodiment the volume of the aliquoting chamber 18 is defined by the internal volume of the U-shaped element and can be easily changed by substituting the element with a U-shaped hollow tubular element of different internal volume. Hence, the precise aliquot amount of blood (or any other sample) to be dispensed with high-precision by the liquid-sampling valve according to the present invention can be flexibly changed in a wide range, and practically in accordance with the actual needs. To maintain high-precision of the dispensing, however, the internal volume of said connecting element should remain constant with high-precision over time.

Here, the programmable logic and control unit LCU controls the operation of components of the sampling unit 100, including the first pump unit PU1, the second pump unit PU2, the first drive unit DU1 actuating (advancing and retracting) the sampling tip 12, the second drive unit DU2 inducing relative movements (rotations) of the upper and lower valve pads P1 and P2, as well as the diluent pump DP which chases the precise aliquot sample in the sample discharging configuration from the liquid-sampling valve 20 into the 70 mix chamber; hence, the first and second drive units DU1 and DU2, the first and second pump units PU1 and PU2, as well the diluent pump DP are all operatively connected to said programmable logic and control unit LCU. Furthermore, the first drive unit DU1 and the second drive unit DU2 are operatively connected to the sampling member 10 and the lower valve pad P2, respectively.

When the sampling unit 100 is mounted rigidly into the analyzer at a suitable location thereof, the upper valve pad P1 becomes fixed to the instrument frame of the analyzer by means of a support frame (not illustrated) and thus relative movement of the first and second valve pads P1 and P2 to allow liquid flow is actually realized by movement (rotation) of the lower valve pad P2 relative to the upper valve pad P1.

Said first and second pump units PU1 and PU2, as well as said diluent pump DP are preferably high-precision syringe pumps that are driven by stepper motors. Thus, measuring the volume/amount of the aspirated blood by the first pump unit PU1 or the volume/amount of the blood drawn through by the second pump unit PU2 can be based, alternatively, on counting the number of steps performed by said stepper motors. Moreover, in a further embodiment, said first and second pump units PU1 and PU2 are provided by one single pump unit. In such a case—according to needs—one or more suitable cross valves are also included in the flow system detailed above; preferably, the applied cross valves are also controlled by the programmable logic and control unit LCU.

In a yet further embodiment of the sampling unit 100, a washing unit 60 is arranged between the liquid-sampling valve 20 and the sample container 50 over the path along which the sampling unit 10 is advanced/retracted. In particular, a cleansing channel 62 (see FIG. 5) coaxially surrounding the sampling unit 10 over a certain length is provided in the washing unit 60, in which the sampling tip 12 is flushed by a suitable washing liquid, preferably by the diluent used anyway with the analyzer, when it is either advanced into or retracted from the sample container 50. Preferably, the processes of feeding in said washing liquid into the cleansing channel 62 and discharging the waste liquid to a waste storage are also controlled by the programmable logic and control unit LCU.

From the foregoing description, it may be appreciated that the sampling unit 100 illustrated in FIGS. 1A and 1B as part of an analytical instrument in various operational configurations provides significantly shorter sample flow path than what is commonly used in prior art. In particular, the sample flow path is limited to the sampling tip of the sampling member as a consequence of the novel liquid-sampling valve construction, in which the operation of taking a sample portion from a sample container and the operation of feeding said sample portion into the liquid-sampling valve are performed at opposite sides of the liquid-sampling valve by the sampling tip that travels through the body of said liquid-sampling valve between the two operations.

Figure 2A:
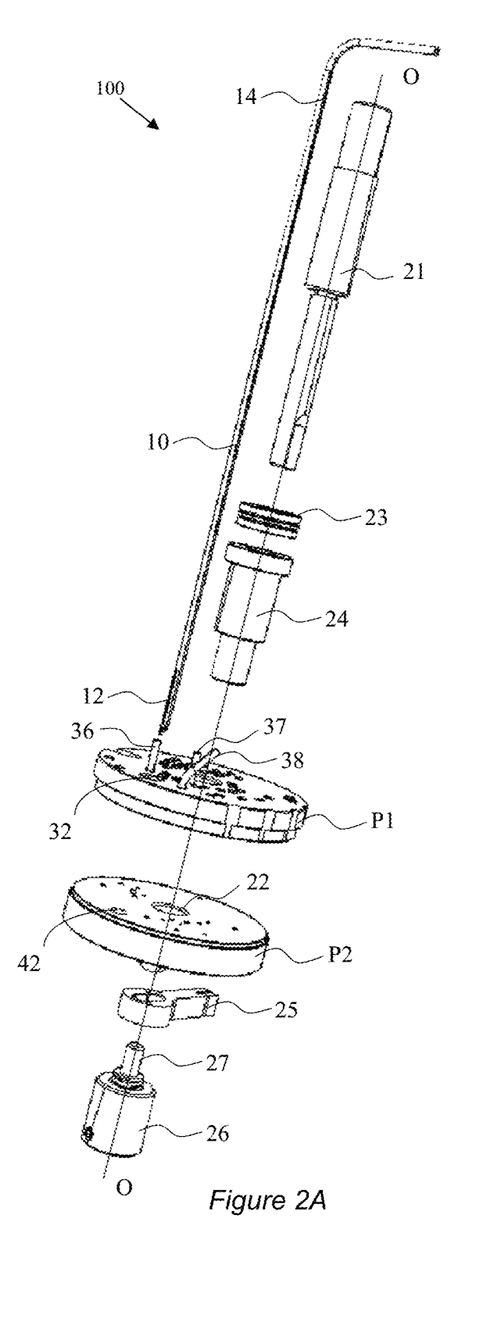
FIG. 2A illustrates schematically an exemplary sampling unit in exploded view.
Figure 2B:
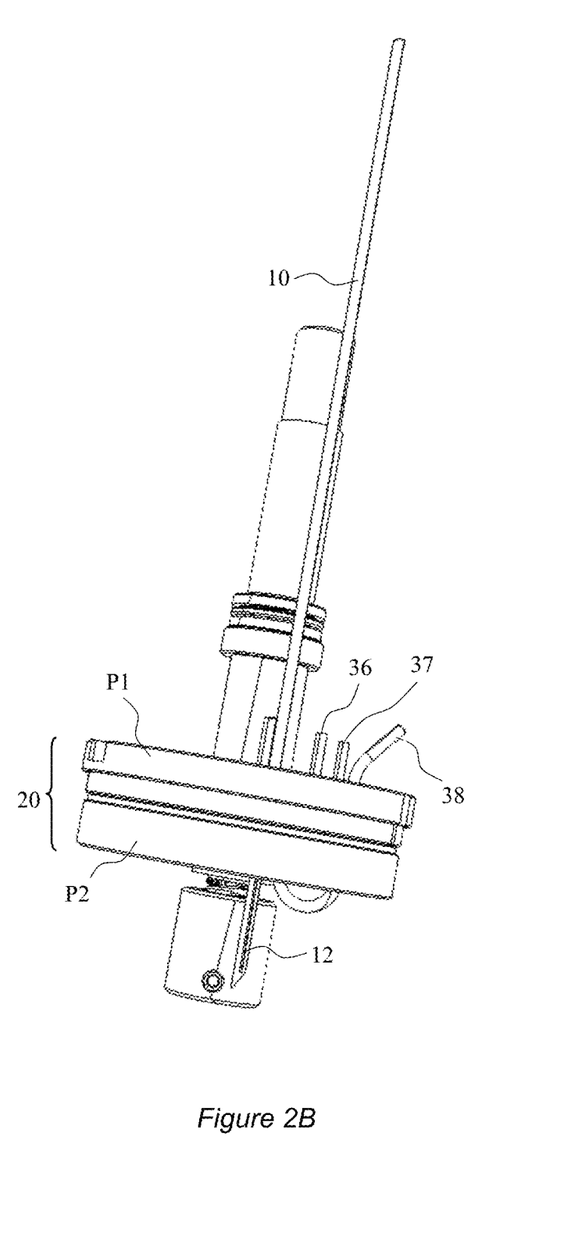
FIG. 2B shows the exemplary sampling unit in its assembled state.

FIGS. 2A and 2B illustrate a possible embodiment of the sampling unit 100 to be used in an automated analytical instrument schematically in exploded view and in its assembled state, respectively, in the above-discussed sample taking configuration. The sampling unit 100 includes a sampling member 10 and a liquid-sampling valve 20. The sampling member 10 is formed as a hollow tubular, preferably straight element that terminates at one ends thereof in a sampling tip 12 while its other end 14 is connectable to a pumping means of the instrument. The sampling tip 12 is either sharpened or butt and serves to access a liquid sample arranged in either a closed or an open sample container (not illustrated), respectively, to aspirate and hold a certain sample amount. The sampling member 10 is mountable into the instrument, in a conventional way, basically for movement in vertical direction along a straight line and through the body of the liquid-sampling valve 20, wherein the latter is adapted to allow such movement of the sampling member 10 through an appropriate guiding channel formed therein, as will be discussed below. As is also obvious to a person skilled in the art, lateral movement, i.e. movement perpendicular to the vertical direction, of the sampling member 10 can also be provided by its mounting into the instrument. As is also apparent from the drawings, the liquid-sampling valve 20 is a shear valve assembly comprising, in the simplest design, two confronting, preferably disk-shaped valve pads, that is, the upper valve pad P1 and the lower valve pad P2. In use, the two valve pads P1, P2 are contiguously arranged on a central shaft 21 with a longitudinal axis O, the central shaft 21 passes through a central opening 22 in each valve pad. A first end of the central shaft 21 is connected to a drive means, preferably an electric motor, e.g. a stepper motor mounted rigidly within the frame of the analytical instrument. The other end of said central shaft 21 is a hollow tubular end with an inner thread formed therein. Said other end passes through a shaft bearing 23, a pad positioning sleeve 24 that fits into the central opening 22 of the valve pads P1 and P2, and the upper valve pad P1 in such a way that, in use, the central shaft 21 can freely rotate around its longitudinal axis O. Said central shaft 21 also passes through the lower valve pad P2, a torque transmission arm 25 and is coupled with a pad fixing mechanism 26 by means of a mating thread 27 formed on said pad fixing mechanism 26. The central shaft 21 is form-fitted with said torque transmission arm 25 which, in turn, as key member, engages a complementary recess (not illustrated) formed in the lower surface of the lower valve pad P2. Hence, when the liquid-sampling valve 20 is assembled, the lower valve pad P2 gets rigidly fixed (keyed) onto the central shaft 21 which means that the lower valve pad P2 can rotate with the central shaft 21. As the upper valve pad P1 is fixed to the instrument frame of the analyzer by means of a support frame (not illustrated), the lower valve pad P2 will rotate relative to the upper valve pad P1 upon actuating the central shaft 21. Hence, a controlled relative positioning of the upper and lower valve pads P1, P2 is possible.

The pad fixing mechanism (see e.g. in FIG. 4 in cross sectional view) serves to push the lower valve pad P2 against the upper valve pad P1 in order to create the required sealing between confronting surfaces of the valve pads P1 and P2. It comprises a fixing spring 28 biased to a certain level. The pad fixing mechanism 26 exerts a force parallel to the longitudinal axis O on the fixing spring 28, which in turn transfers the force to compress the upper and the lower valve pads P1 and P2 together via said torque transmission arm 25. The magnitude of the force compressing the upper and the lower pads P1 and P2 together can be adjusted by the depth of the pad fixing mechanism 26 screwed into the inner thread of the central shaft 21.

Figure 3A:
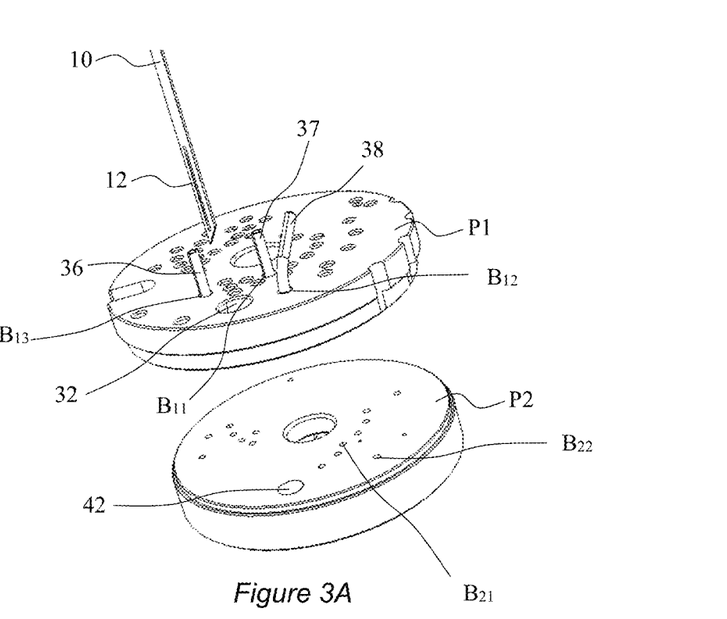
FIGS. 3A and 3B are exploded perspective illustrations of a preferred liquid-sampling valve used in the sampling unit of FIG. 2.
Figure 3B:
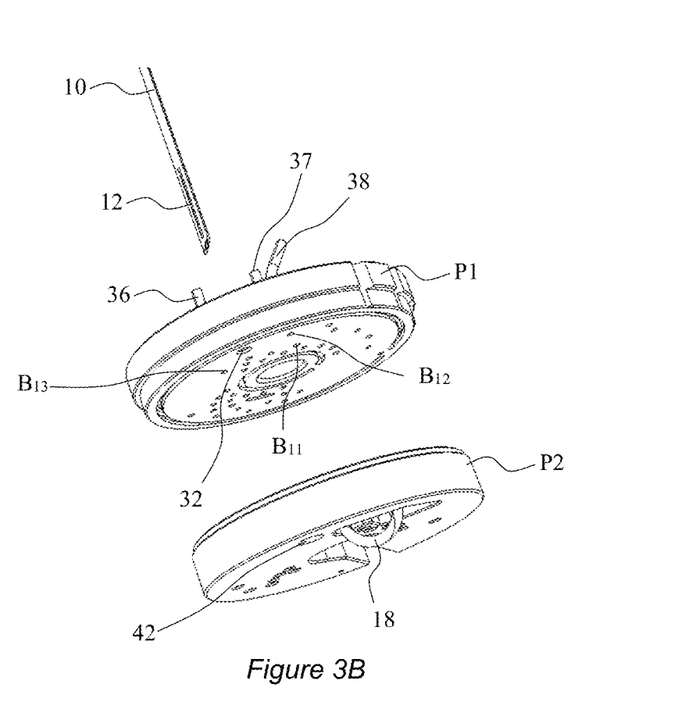

FIGS. 3A and 3B are upper and lower exploded perspective views, respectively, illustrating the relative position of the valve pads P1 and P2 while the sampling unit 10 is about to perform the operation of sample taking through both valve pads P1 and P2. To this end, the upper valve pad P1 and the lower valve pad P2 are provided with through bore holes 32 and 42, respectively, which in the sample taking configuration are fully aligned and thus form a guiding channel for the sampling member 10 through the valve body with the combined height of the two valve pads P1 and P2. In this way, the sample flow path is actually decreased to the distance run by the sample in the sampling tip 12 while being aspirated.

The liquid-sampling valve 20 comprises a selectably operable flow structure formed in the cooperative upper and lower valve pads P1 and P2 first to dispense a predetermined precise aliquot amount of liquid sample and then to discharge it for further processing. Said flow structure is defined by a first set of through bores B11, B12 and B13 formed in the upper valve pad P1, as well as a second set of through bores B21 and B22 formed in the lower valve pad P2 and the aliquoting chamber 18 itself that extends from the through bore B21 to the through bore B22 in the form of a hollow connecting element as shown in the Figures. Into each bores of the first set of thorough bores B11, B12 and B13, appropriate tubings are affixed in order to form ports that are connectable to various pumping means (see e.g. FIGS. 1A and 1B) of the instrument when in use. In particular, tubings affixed into each of the bores B11, B12 and B13 form an inlet port 37, an outlet port 38 and a suction port 36, respectively, of the liquid-sampling valve 20. Selective operability of the flow structure is provided by positioning the lower valve pad P2 relative to the upper valve pad P1 via rotating the former into (i) a first valve position, in which through bore B22 opens into through bore hole 32 and through bore B21 is aligned with through bore B13 thereby creating a first continuous liquid path from through bore hole 32 to said suction port 36, and into (ii) a second valve position, in which through bore B11 is aligned with through bore B21 and through bore B12 is aligned with through bore B22 thereby creating a second continuous liquid path from said inlet port 37 to said outlet port 38. In this way, in use, the first continuous liquid path is suitable for feeding an amount of sample from the sampling tip 12 into the liquid-sampling valve 20 through the bore B22 serving as inlet, while the second continuous liquid path is suitable for discharging the precise aliquot volume of sample through the bore B12 serving as outlet for further processing. Here, segmenting (or dispensing) the aliquot volume of the sample takes place simultaneously with changing the first valve position into the second valve position by rotating said lower valve pad P2 with respect to the upper valve pad P1 around the longitudinal axis O of the liquid-sampling valve 20. By the above-discussed selectively operable flow structure, there is provided a liquid-sampling valve 20 of very simple design to be used in an automated analytical instrument for the sampling of both open and closed sample containers, and in case of the latter, independently of the pressure inside the sample container.

Preferably, each of the valve pads P1 and P2 is made of a non-reacting ceramic material, and the planar, confronting surfaces of said pads are polished to prevent leaking of liquid from the ports and the flow structure constructed in the liquid-sampling valve 20 when the pads are arranged contiguously. Said ports 36, 37, 38 are made of non-corroding steel or teflon tubings with an inner diameter chosen from the range of 0.5 mm to 1.0 mm. Diameters of said through bore holes 32 and 42 correspond to the outer diameter of the sampling member 10 and/or its sampling tip 12. In one preferred embodiment, for example, the outer diameter of the sampling member 10 is in the range of 1 to 3 mm, and preferably is about 1.6 mm, hence the through bore holes 32 and 42 are at least 2 to 5 mm in diameter which allows easy advance/retraction of the sampling tip 12 through the guiding channel formed by the aligned through bore holes 32 and 42.

Figure 4:
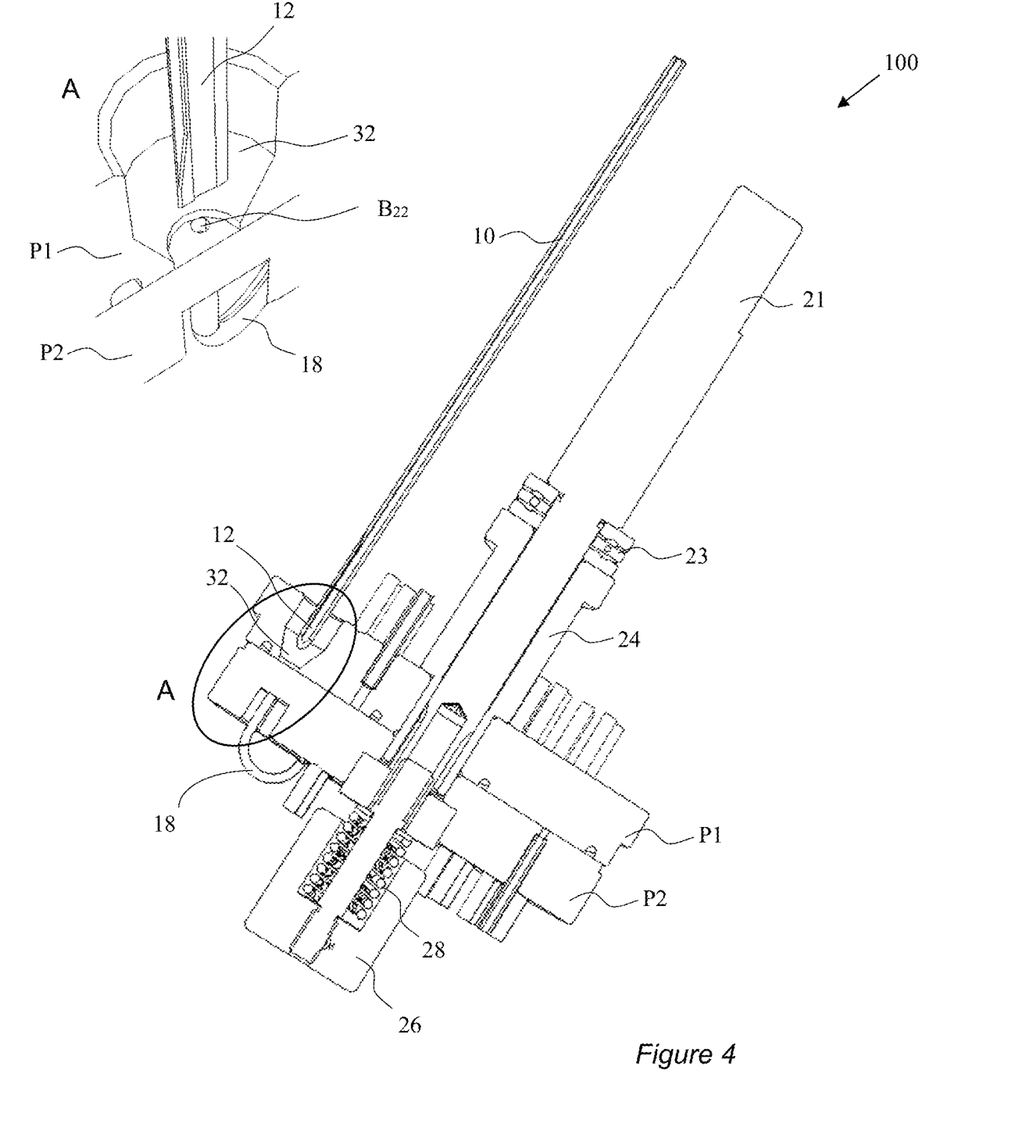
FIG. 4 is a sectional elevation view of the sampling unit shown in FIG. 2 with the inset being the enlarged view of portion A of said unit.

FIG. 4 is a sectional elevation view of the sampling unit 100 shown in FIG. 2 with the inset being the enlarged view of portion A of said unit. FIG. 4 depicts the sampling unit 100 in the sample loading configuration, i.e. when the sample previously taken from the sample container is delivered with the sampling tip 12 to the inlet of the flow structure (constructed in the first valve position) and expelled into it. Generally, the through bore hole 32 is cylindrical in shape, like all the other through bores/bore holes formed in the valve pads P1 and P2. In one preferred embodiment, as is shown in FIG. 4, through bore hole 32 has a tapered longitudinal cross-section in its lower section. Such a tapered construction of the through bore hole 32 facilitates sample displacement when loading into the sampling valve takes place. Through bore B22 occupies an off-axis position relative to the central position of the sampling tip 12. Moreover, the diameter of said bore B22 is smaller than that of the through bore hole 32 at its narrowest part, where it opens to the lower valve pad P2. Preferably, the bore B22 locates adjacent to the perimeter of the bore hole 32 in its cross-section. The off-axis position of the bore B22, in turn, facilitates feeding of the sample in its entirety from said bore hole 32 (inlet of the flow structure) into the liquid-sampling valve while being drawn through the suction port 36, as suction continuously takes place at a location where, due to wetting properties of the sample (e.g. body fluids, in general, are of relatively high viscosity and wet ceramic surfaces) and capillary behavior of the bore hole 32, thickness of the liquid sample keeps to be constantly the largest while suction is applied. The off-axis design, hence, leads to feeding practically all the sample into the liquid-sampling valve, thereby allowing optimal sample consumption, that is, making use of the sample that has been taken from the sample container to an extremely high degree and, thus, with a low waste ratio.

Figure 5:
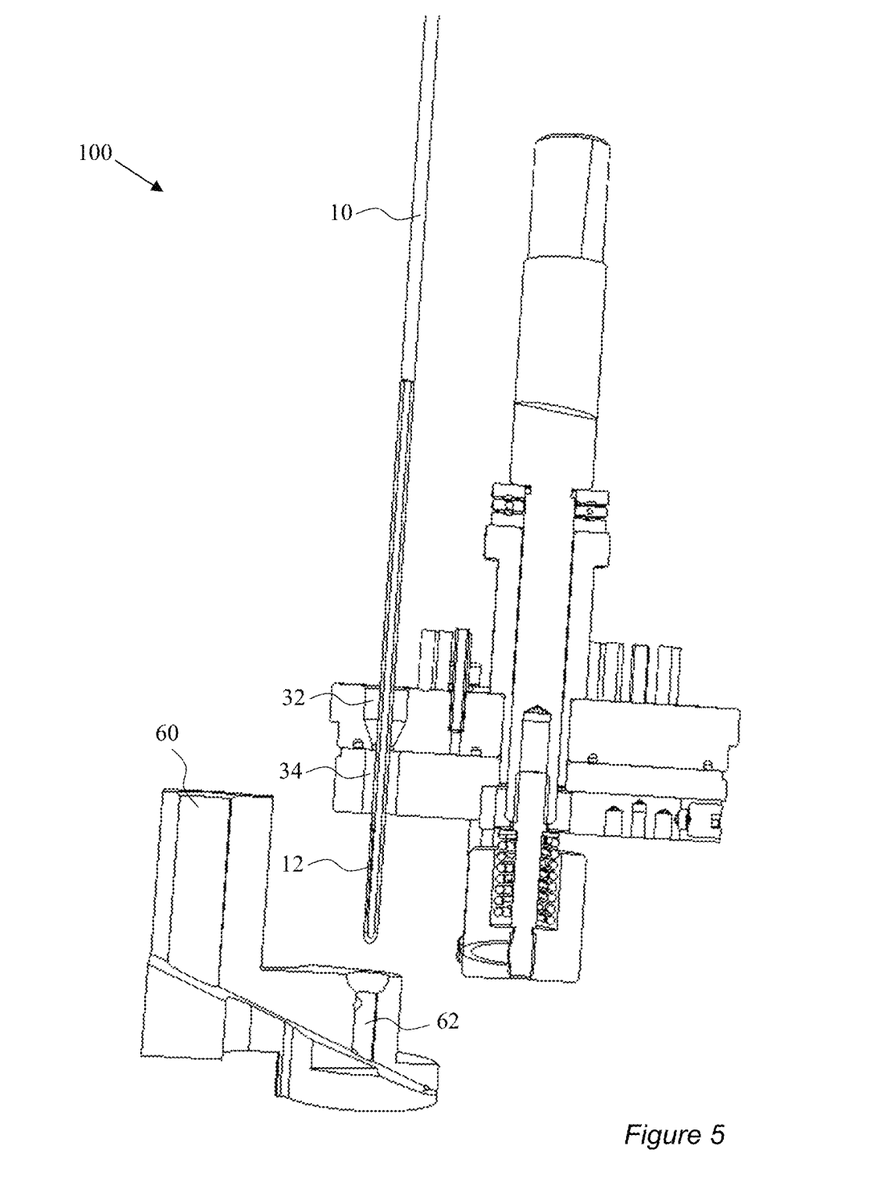
FIG. 5 is a sectional elevation view of the combination of the sampling unit of FIG. 2 with a separate washing unit in the cleansing position for cleansing the sampling tip of the sampling member used in the exemplary sampling unit.

FIG. 5 illustrates schematically a possible further embodiment of the sampling unit 100 according to the invention, wherein there is also provided a washing unit 60 in combination with the sampling unit 100 to wash and, thus, cleanse the sampling tip 12 of the sampling member 10 while said sampling member 10 is advanced into and/or retracted from a sample container (not illustrated) through a cleansing channel 62 by its actuation means. By washing the sample tip 12, an accidental cross-contamination of various samples subjected to subsequent samplings by the sampling unit 100 in an automated analytical instrument is avoided.

Figure 6A:
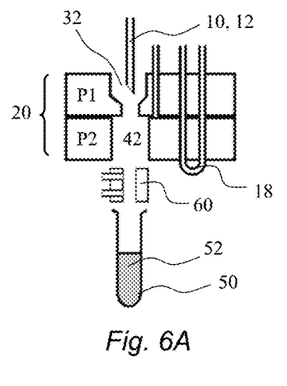
FIGS. 6A to 6I show various phases of a first variant of the sampling process performed by the exemplary sampling unit of FIG. 2 used in the analytical instrument illustrated in FIGS. 1A and 1B.
Figure 6B:
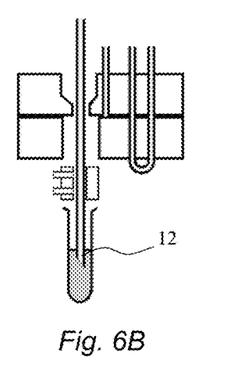
Figure 6C:
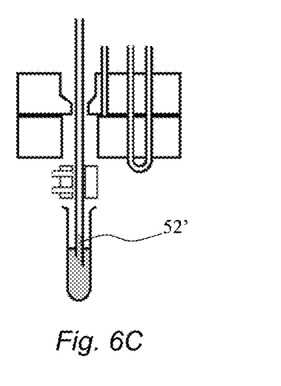
Figure 6D:
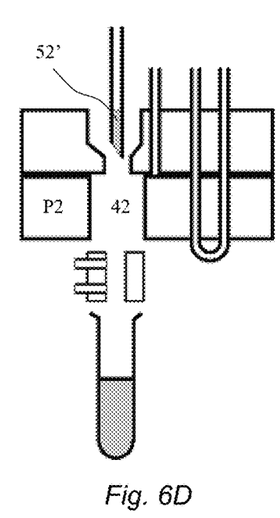
Figure 6E:
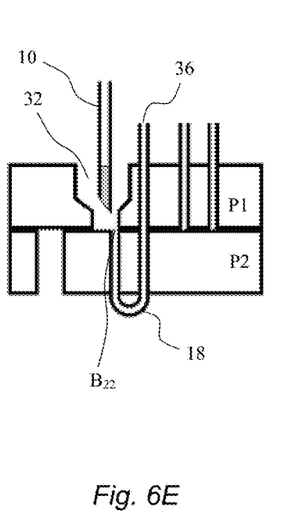
Figure 6F:
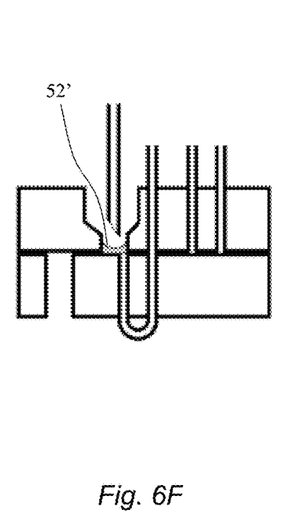
Figure 6G:
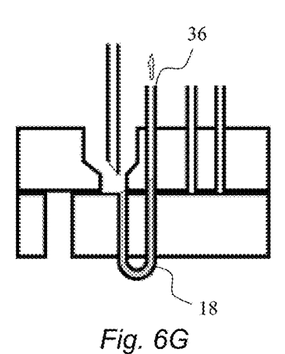
Figure 6H:
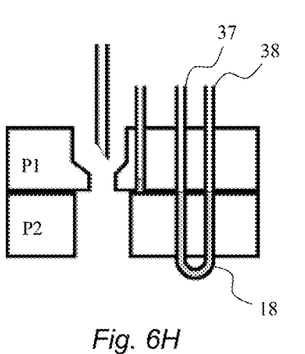
Figure 6I:
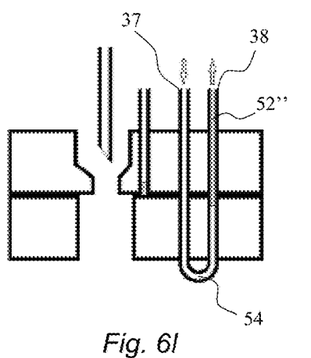

FIGS. 6A to 6I depict the steps of a possible first variant of the sampling process performed by the exemplary sampling unit of FIG. 2 used in the analytical instrument illustrated in FIGS. 1A and 1B. Before starting the sampling process, normally all conduits/tubings of the instrument are primed with cleansing reagent or diluent. After completion of this, the sampling unit is ready to start with the procedure. In particular, as shown in FIG. 6A, the sampling unit is set into the sample taking configuration, in which the liquid-sampling valve 20 prepares for taking liquid sample from a sample container 50. To this end, the bore holes 32 and 42 of the upper and lower valve pads P1 and P2, respectively, are mutually aligned with one another by rotating the lower valve pad P2 with respect to the upper valve pad P1, forming thereby an unobstructed path of displacement in the valve body in the form of a guiding channel through which the sampling member 10, in particular its sampling tip 12 advances from one side of the liquid-sampling valve 20 to the other side thereof, then punctures the closure means of the sample container 50, if needed, and enters (see FIG. 6B) the sample 52. At this position of the sampling member 10 a predetermined amount of sample 52' is aspirated into the sampling tip 12 by an external negative-pressure source (see FIG. 6C). Then said sampling tip 12 with the predetermined amount of sample 52' is retracted from the sample container into a position that is located just above the bore hole 42 of said lower valve pad P2 (see FIG. 6D), thereby preparing for sample loading. Now, by rotating the lower valve pad P2 with respect to the upper valve pad P1 (that is, by changing the valve position) the sampling unit will get into the sample loading configuration, wherein the suction port 36 is in direct fluid communication through the aliquoting chamber 18 and the through bore B22 with the through bore hole 32 (see FIG. 6E), thereby creating a first continuous liquid path (or flow structure). As a next step, the predetermined amount of sample 52' is expelled from the sampling tip 12 by an external positive-pressure source into the bore hole 32 and over the inlet of said first liquid path (see FIG. 6F). Now, without changing the actual configuration of the sampling unit, the predetermined amount of sample 52' is being drawn through the first liquid path through the suction port 36 by a negative-pressure source until the aliquoting chamber 18 gets completely filled with the liquid sample (see FIG. 6G). At this moment (with some delay, of course, due to control), segmenting or isolating a precise aliquot 52" of sample is performed by setting the sampling unit into the segmenting/dispensing configuration by rotating the lower valve pad P2 with respect to the upper valve pad P1 so as to create a second continuous liquid path that extends from the inlet port 37 through the aliquoting chamber 18 (filled with sample) to the outlet port 38 of the liquid-sampling unit (see FIG. 6H). Finally, in the actual configuration of the sample unit, the aliquot 52" of sample is chased into the mix chamber for further processing through the second liquid path by a liquid diluent 54 fed into the second liquid path at the inlet port 37 (see FIG. 6I).

FIGS. 7A to 7M show the steps of a possible second variant of the sampling process performed by the exemplary sampling unit of FIG. 2 used in the analytical instrument illustrated in FIGS. 1A and 1B. This variant of the sampling process is especially useful to avoid primary sampling error, that is, the problem of bubble formation in the sample taken and of taking an insufficient amount sample. Hence, reliability of sampling/dispensing increases significantly. To achieve the increase, after aspirating sample into the sampling member through the sampling tip, a tiny amount of air is first sucked into the sampling member through said tip and then is removed from the tip by applying a positive pressure on the aspirated sample amount, as discussed below in detail.

Figure 7A:
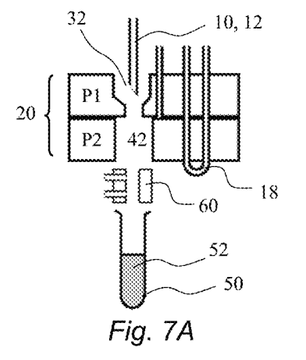
FIGS. 7A to 7M show various phases of a second variant of the sampling process performed by the exemplary sampling unit of FIG. 2 used in the analytical instrument illustrated in FIGS. 1A and 1B.
Figure 7B:
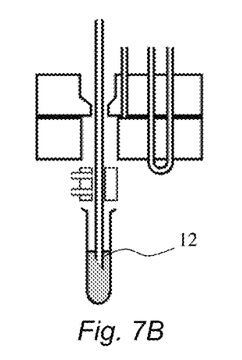
Figure 7C:
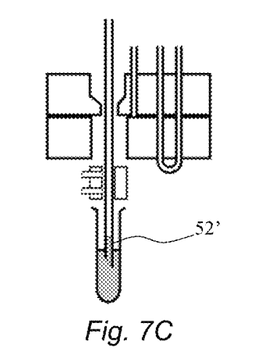
Figure 7D:
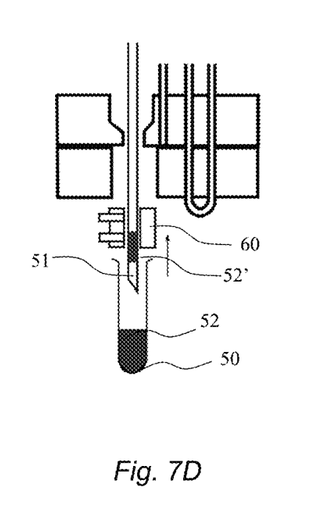
Figure 7E:
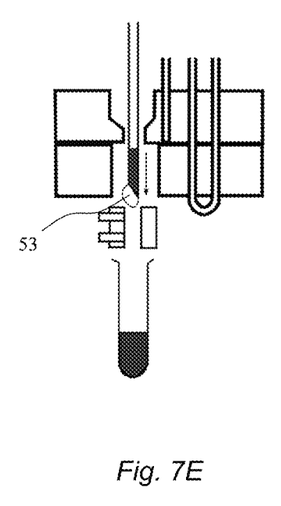
Figure 7F:
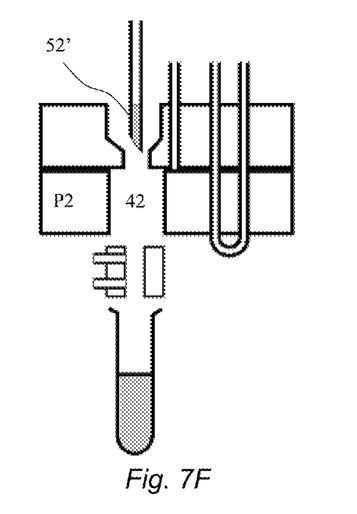
Figure 7G:
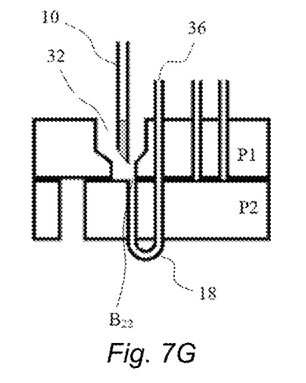
Figure 7H:
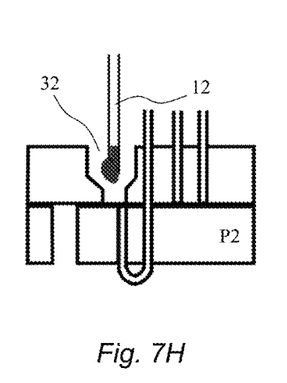
Figure 7I:
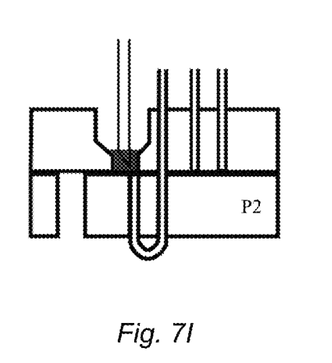
Figure 7J:
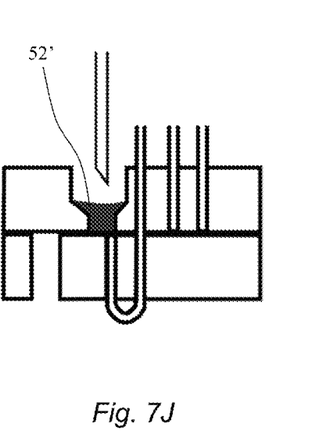

Referring now to FIG. 7, again, before starting the sampling process, all conduits/tubings of the instrument are primed with cleansing reagent or diluent. After completing this step, the sampling unit is ready to start with the sampling procedure. In particular, as shown in FIG. 7A, the sampling unit is set into the sample taking configuration, in which the liquid-sampling valve 20 prepares for taking liquid sample from a sample container 50. To this end, the bore holes 32 and 42 of the upper and lower valve pads P1 and P2, respectively, are mutually aligned with one another by rotating the lower valve pad P2 with respect to the upper valve pad P1, forming thereby an unobstructed path of displacement in the valve body in the form of a guiding channel through which the sampling member 10, in particular its sampling tip 12 advances from one side of the liquid-sampling valve 20 to the other side thereof, then punctures the closure means of the sample container 50, if needed, and enters (see FIG. 7B) the sample 52. At this position of the sampling member 10 a predetermined amount of sample 52' is aspirated into the sampling tip 12 by an external negative-pressure source (see FIG. 7C). Then said sampling tip 12 with the predetermined amount of sample 52' is retracted from the sample 52 arranged in the sample container 50 into a position where said tip 12 is still located below the washing unit 60. In this position, by means of operating said external negative-pressure source for a short period of time, a tiny amount of air 51 (in the form of an air column) is drawn into the sampling tip 12 (see FIG. 7D) just behind said sample 52'. Then, the sampling member 10 is retracted further and travels through the washing unit 60 to cleanse the outer surface of the sampling tip 12 into a position that is located just above the washing unit 60 (see FIG. 7E). Then, in this rest position of the sampling member 10, the air 51 is removed from the sampling tip 12 at a low rate in small amounts by operating an external positive-pressure source. Simultaneously, any diluent films 53 that might form on the very end of said sampling tip 12 in the washing unit 60 when cleansing the sampling tip 12 takes place is also removed. Thus, sample dilution at a later sample loading is avoided. After removing the air 51 (and also the diluents films 53), the sampling member 10 is retracted into a position that is located above the bore hole 42 of said lower valve pad P2 (see FIG. 7F), thereby preparing for sample loading. Now, by rotating the lower valve pad P2 with respect to the upper valve pad P1 (that is, by changing the valve position) the sampling unit will get into the sample loading configuration, wherein the suction port 36 is in direct fluid communication through the aliquoting chamber 18 and the through bore B22 with the through bore hole 32 (see FIG. 7G), thereby creating a first continuous liquid path (or flow structure). As a next step, the predetermined amount of sample 52' is expelled from the sampling tip 12 by an external positive-pressure source into the bore hole 32 and over the inlet of said first liquid path (see FIGS. 7H to 7J). In particular, the sampling tip 12 first approaches to the lower valve pad P2 in the bore hole 32 and is stopped before reaching it (see FIG. 7H), i.e. there is no contact between said tip 12 and the upper surface of said lower valve pad P2. Now, the predetermined amount of sample 52' is slowly expelled from the sampling tip 12, while said tip 12 is moved into contact with the lower valve pad P2 (see FIG. 7I). By performing sample loading in this way, bubble formation in the bore hole 32 under the sample 52' expelled into it is avoided. After expelling the predetermined amount of sample 52', the sampling member 10 is retracted from the lower valve pad P2 into the bore hole 32 (see FIG. 7J). Now, the sample 52' will (at least) partially occupy said bore hole 32. As is clear for a skilled person in the art, the amount of air 51 drawn into and then removed from the sampling tip 12, as well as the rate of expelling the sample 52' from the sampling tip 12 is performed under control of the analytical instrument itself in harmony with stored pre-set values that depend on the type of sample.

Figure 7K:
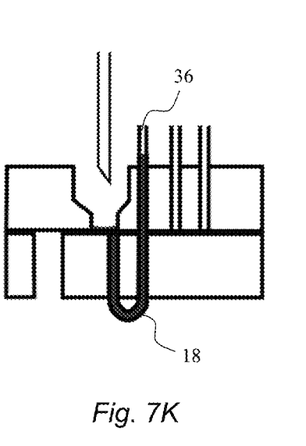
Figure 7L:
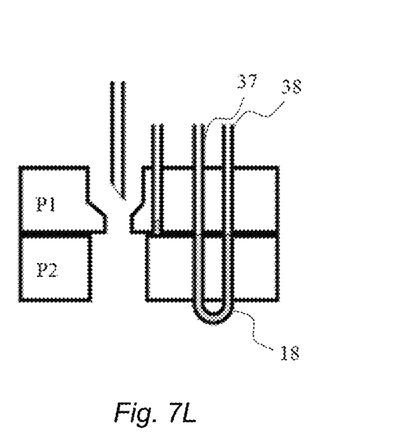
Figure 7M:
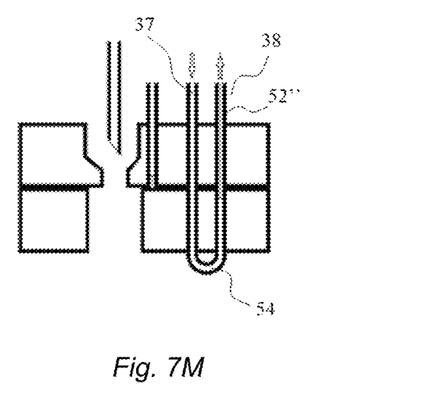

Now, without changing the actual configuration of the sampling unit, the predetermined amount of sample 52' is being drawn through the first liquid path through the suction port 36 by a negative-pressure source in tiny amounts (depending on the application, preferably in steps of 1 µl) until the aliquoting chamber 18 gets completely filled with the liquid sample (see FIG. 7K). At this moment (with some delay, of course, due to control), segmenting or isolating a precise aliquot 52" of sample is performed by setting the sampling unit into the segmenting/dispensing configuration by rotating the lower valve pad P2 with respect to the upper valve pad P1 so as to create a second continuous liquid path that extends from the inlet port 37 through the aliquoting chamber 18 (filled with sample) to the outlet port 38 of the liquid-sampling unit (see FIG. 7L). Finally, in the actual configuration of the sample unit, the aliquot 52" of sample is chased into the mix chamber for further processing through the second liquid path by a liquid diluent 54 fed into the second liquid path at the inlet port 37 (see FIG. 7M).

It should be noted that the very final segmenting/dispensing configuration of the sampling unit in the above discussed sampling processes essentially corresponds to the initial sample taking configuration thereof as far as the flow structure of the liquid-sampling valve is concerned. Hence, the sampling procedure discussed above can be restarted to take either a further aliquot amount of the same sample or an aliquot amount of a further sample arranged in the sampling position below the sampling unit 100 in a further sample container.

In the foregoing, terms 'negative-pressure' and 'positive-pressure' refer to pressure values below and above the ambient pressure. That is, a negative-pressure source in the system discussed above represents suction, while a positive-pressure source represents expelling.

The invention has been described in detail with regard to a particularly preferred embodiment. It is apparent, however, that many changes and variations thereof may be made without departing from the spirit of the invention, and such changes and variations are also intended to fall within the scope of the attached claims.

The invention claimed is:

1. A sampling unit (100) to dispense a precise volume of liquid sample from a sample container (50) in an automated analytical instrument, the sampling unit comprising:
   at least one pump unit;
   at least one drive unit;
   a control unit operably connected to control the at least one pump unit and the at least one drive unit;
   an elongated hollow sampling member (10) comprising a first end including a sampling tip (12) and a second end (14), where in the sample member extends along a longitudinal axis between the first and second ends, and the second an end (14) is connected to a pump unit of the at least one unit;
   wherein the sampling member (10) is adapted to move between a first position and a second position via operation of a drive unit of the at least one drive unit, and the sampling tip (12) is adapted to be filled, in said first position, with liquid sample from the sample container through aspiration by one pump unit of the at least one pump unit; and
   a liquid-sampling valve (20) fluidically connected to the at least one pump unit and the sampling member, the liquid-sampling valve having a valve body comprising a flow structure including an inlet and an outlet, said flow structure including an aliquoting chamber (18) having a volume fluidically connectable to the inlet and outlet, the liquid-sampling valve (20) being selectively operable in either of both:
      (i) a first valve position in which the flow structure is adapted to be loaded with liquid sample through the inlet, said liquid sample is provided directly from the sampling tip (12) in the second position of the sampling member (10), and
      (ii) a second valve position in which the flow structure is adapted to dispense the volume of liquid sample through the outlet,
   wherein said aliquoting chamber (18) is configured to provide the volume of liquid sample via segmenting the liquid sample loaded into the flow structure in the first valve position;
   wherein the sampling tip (12) is adapted to discharge, in said second position of the sampling member, liquid sample through expelling by one pump unit of the at least one pump unit; and
   wherein the liquid-sampling valve (20) further defines, in the first second valve position, a guiding channel extending through the valve body in parallel with the longitudinal axis of said sampling member, said guiding channel configured to allow movement of the sampling member (10) between said first and second positions of the sampling member through the valve body, and
   wherein in the first valve position, the inlet is located within a same volume portion of the valve body that is occupied by the guiding channel in the second valve position and the inlet is located at a position shifted away from a central axis of the guiding channel.

2. The sampling unit according to claim 1, wherein the inlet has a diameter that is smaller than a cross-sectional size of the guiding channel.

3. The sampling unit according to claim 1, wherein the inlet is located adjacent to a wall of the guiding channel.

4. The sampling unit according to claim 1, wherein the valve body comprises a contiguous, fixed upper shear valve pad (P1) and lower shear valve pad (P2), the lower valve pad (P2) being movable relative to the fixed upper valve pad (P1) between said first and second valve positions;
   said upper shear valve pad (P1) is comprises first and second planar surfaces and a first guiding hole (32) extending between said first and second surfaces through the upper valve pad (P1) in parallel with the longitudinal axis of said sampling member (10); and at least a first through bore (B11), a second through bore (B12) and a third through bore (B13), each of said bores extending between said first and second surfaces through the upper valve pad (P1);
   said lower shear valve pad (P2) comprises first and second planar surfaces and a second guiding hole (42) extending between said first and second surfaces of the lower shear valve pad through the lower valve pad (P2) in parallel with the longitudinal axis of said sampling member (10); and at least a first through bore (B21) and a second through bore (B22), said bores extending between said first and second surfaces of the lower shear valve pad through the lower valve pad (P2) and being in fluid communication with one another through a hollow connecting element so as to form said aliquoting chamber (18) of precise volume; and wherein
   in the first valve position, the second through bore (B22) in the lower valve pad (P2) opens into the first guiding hole (32) and the first through bore (B21) in the lower valve pad (P2) is aligned with the third through bore (B13) in the upper valve pad (P1) thereby creating a continuous flow structure with said second through bore (B22) serving as the inlet, and
   in the second valve position, the first through bore (B11) in the upper valve pad (P1) is aligned with the first through bore (B21) in the lower valve pad (P2) and the second through bore (B12) in the upper valve pad (P1) is aligned with the second through bore (B22) in the lower valve pad (P2) thereby creating a continuous flow structure with said second through bore (B12) serving as the outlet, and
   in the first second valve position, said first guiding hole (32) is aligned with said second guiding hole (42) thereby creating the guiding channel.

5. The sampling unit according to claim 4, wherein the first guiding hole (32) defines a tapered longitudinal cross-section in a lower section thereof.

6. The sampling unit according to claim 4, wherein said connecting element is a U-shaped hollow tubular element including an internal volume.

\* \* \* \* \*